(12) United States Patent
Lokkinen

(10) Patent No.: US 10,245,624 B2
(45) Date of Patent: *Apr. 2, 2019

(54) DEVICE AND SYSTEM FOR OPENING UP BRANCH POINT OF PIPE ASSEMBLY

(71) Applicant: Picote Solutions Oy Ltd., Porvoo (FI)

(72) Inventor: Mika Lokkinen, Porvoo (FI)

(73) Assignee: Picote Solutions Oy Ltd., Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,089

(22) Filed: Apr. 20, 2018

(65) Prior Publication Data

US 2018/0236506 A1 Aug. 23, 2018

Related U.S. Application Data

(63) Continuation of application No. 15/117,095, filed as application No. PCT/FI2015/050074 on Feb. 6, 2015, now Pat. No. 9,975,153.

(30) Foreign Application Priority Data

Feb. 10, 2014 (FI) .................................. 20145129

(51) Int. Cl.
| | |
|---|---|
| *B08B 9/043* | (2006.01) |
| *B08B 9/045* | (2006.01) |
| *B23B 51/08* | (2006.01) |
| *F16L 55/18* | (2006.01) |
| *F16L 55/179* | (2006.01) |
| *F16L 41/00* | (2006.01) |

(52) U.S. Cl.
CPC ............ *B08B 9/0436* (2013.01); *B08B 9/045* (2013.01); *B23B 51/08* (2013.01); *F16L 55/179* (2013.01); *F16L 55/18* (2013.01); *F16L 41/00* (2013.01); *Y10T 408/353* (2015.01); *Y10T 408/557* (2015.01)

(58) Field of Classification Search
CPC ... B23B 51/0054; B23B 51/08; B08B 9/0436; F16L 55/179; F16L 55/18; Y10T 408/352; Y10T 408/353; Y10T 408/557; Y10T 408/558; Y10T 408/5583; Y10T 408/5586

See application file for complete search history.

(56) References Cited

U.S. PATENT DOCUMENTS 2,478,310 A * 8/1949 Payne .................... B23B 3/265
  408/80
3,950,461 A * 4/1976 Levens ................. F16L 55/179
  264/46.5

(Continued)

FOREIGN PATENT DOCUMENTS

FI     10374       *  1/2014
FR     2994871 A1  *  3/2014  ......... B23B 51/0406

(Continued)

*Primary Examiner* — Eric A Gates
(74) *Attorney, Agent, or Firm* — Fasth Law Offices; Rolf Fasth

(57) ABSTRACT

The device is for opening up a branch point of a pipe assembly. The device has a tip part arranged to be rotated, in connection with which there is at least one blade, and spring-loaded discs and protrusions which are separate from the tip part and arranged to remain essentially non-rotating as the tip part is rotated.

7 Claims, 3 Drawing Sheets

(56) References Cited

U.S. PATENT DOCUMENTS

| | | | | |
|---|---|---|---|---|
| 4,029,428 A | * | 6/1977 | Levens | F16L 55/179 |
| | | | | 175/61 |
| 4,050,836 A | * | 9/1977 | Anders | B23B 29/03446 |
| | | | | 29/560 |
| 4,245,970 A | * | 1/1981 | St. Onge | B29C 44/386 |
| | | | | 138/93 |
| 5,411,082 A | * | 5/1995 | Kennedy | E21B 7/061 |
| | | | | 166/181 |
| 5,520,569 A | * | 5/1996 | Endoh | B23B 51/105 |
| | | | | 408/27 |
| 7,618,220 B2 | * | 11/2009 | Al-Hussain | B23B 51/08 |
| | | | | 407/29.13 |
| 2008/0083567 A1 | * | 4/2008 | Downton | E21B 7/067 |
| | | | | 175/73 |

FOREIGN PATENT DOCUMENTS

| | | | | |
|---|---|---|---|---|
| GB | 622874 A | * | 5/1949 | B08B 9/0553 |
| JP | 02278096 A | * | 11/1990 | F16L 55/18 |

* cited by examiner

DEVICE AND SYSTEM FOR OPENING UP BRANCH POINT OF PIPE ASSEMBLY

PRIOR APPLICATIONS

This is a continuation patent application that claims priority from US national phase patent application Ser. No. 15/117,095, filed 5 Aug. 2016, that claims priority from PCT/FI2015/050074, filed 6 Feb. 2015, that claims priority from Finnish Patent Application No. 20145129, filed 10 Feb. 2014.

FIELD OF THE INVENTION

The invention relates to renovation of a pipe system and, in particular, to machining material inside the pipe system in connection with renovation work.

Pipe systems, for example drainpipe systems of buildings, are typically renovated by replacing the pipes with completely new ones or by coating the inner surfaces of existing pipes with an appropriate coating technique and coating material.

When the pipes in a building are replaced with completely new ones, often structures of the building have to be destructed by chipping, for instance, so that old pipes can be detached from the walls of the building. It is expensive, dirty and time-consuming work to destruct and rebuild wall structures. Because of the noise and dust caused by the renovation work it is often impossible to live on the premises being renovated during the renovation work.

Pipe systems may also be renovated by coating the inner surfaces thereof. One technique of this sort is a so-called lining technique, in which a liner is slipped into a sewer to be repaired and is impregnated with a special epoxy resin which forms, when hardening, a continuous and leak-proof pipe that is, among other things, self-supporting, acid-proof, food-grade and environmentally friendly. The wall thickness of the pipe liner is, depending on the size of the pipe, 2-4 mm, and its smooth inner surface guarantees excellent flow properties. The durability, environmental safety and service life of the pipe having been installed in place and hardened are comparable with corresponding properties of new pipes.

One of the problems of lining is that once the liner has been installed in a thick, vertical main line, for example, all the joints to sewer lines coming from apartments and made of thinner pipe are blocked. The joints must thus be provided with holes to enable waste waters to flow from lines coming from apartments, for example, to the main line. In prior art solutions, the holes are made via the main line with, for instance, a robot drill. Robot drills are large in size, expensive and complex devices, the use of which requires special expertise of the user. As a result of incorrect use, a hole may be partly or entirely drilled in a wrong place.

In cast iron sewers, a device specifically built for the purpose may be used, by which the hole is drilled via the smaller pipe whereby the hole can always be made in the correct spot. The operation of the device is, however, partly based on the hardness of cast iron, which allows forceful measures to be used inside a pipe without possibly breaking the pipes. Such a device cannot, however, be used in plastic sewer systems, such as those made of PVC, because the device will break the fragile plastic pipe very soon.

Due to the problems referred to in the above, the popularity of coating techniques when performing pipe system renovation, in particular for plastic sewer systems, has remained very minor.

The aim of the present invention is to disclose a device and system for machining pipe assemblies, such as sewer pipe systems, and the joints therein, in particular. It is a further goal of the invention to disclose a device and system that may also be used in connection with plastic pipe assemblies, too.

BRIEF DESCRIPTION OF THE INVENTION

Thus, an object of the invention is to provide a device and arrangement so as to solve the above-mentioned problems. The object of the invention is achieved by a device and system which are characterised by what is disclosed in the independent claims. Preferred embodiments of the invention are disclosed in the dependent claims.

The invention is based on a device which is pushed in a pipe leading to the branch point to be opened up in the pipe assembly, and which has, in its tip part, one or more blades that may be rotated by means of a rotation axle attachable to the tip part. The device additionally includes centralizing means through which the rotation axle may freely pass and rotate without the centralizing means rotating at least in any significant amount. In their simplest form, the centralizing means comprise a set of spring-loaded discs, such as plastic discs, strung on the rotation axle, and tubes between the discs. As a result of the spring loading, while in unoperated state, the tubes that separate the discs keep the discs straight so that they protrude radially from the rotation axle and the device is centralized to the centre of the pipe when the outer diameter of the discs equals the inner diameter of the pipe. When hitting an obstacle or reaching a bend, the spring is compressed and allows the tubes between the discs to move, whereby the discs may turn and pass obstacles or bends in the pipe.

The benefit of the method and system according to the invention is that the device may safely be moved and used in plastic pipes, too, without damaging the pipe, because discs that do not rotate will not damage the pipe. The discs are of elastic material and the spring-loading additionally allows the discs to turn, whereby it is possible to push the device into most difficult places behind several bends all the way to the machining area. Because the discs do not rotate when the tip part and the blades are rotating, a hole may be drilled via the plastic pipe without the risk of the plastic pipe melting or being damaged in some other way.

BRIEF DESCRIPTION OF THE FIGURES

The invention will now be described in more detail in connection with preferred embodiments and with reference to the accompanying drawings, in which.

DETAILED DESCRIPTION OF THE INVENTION

Figure 1:
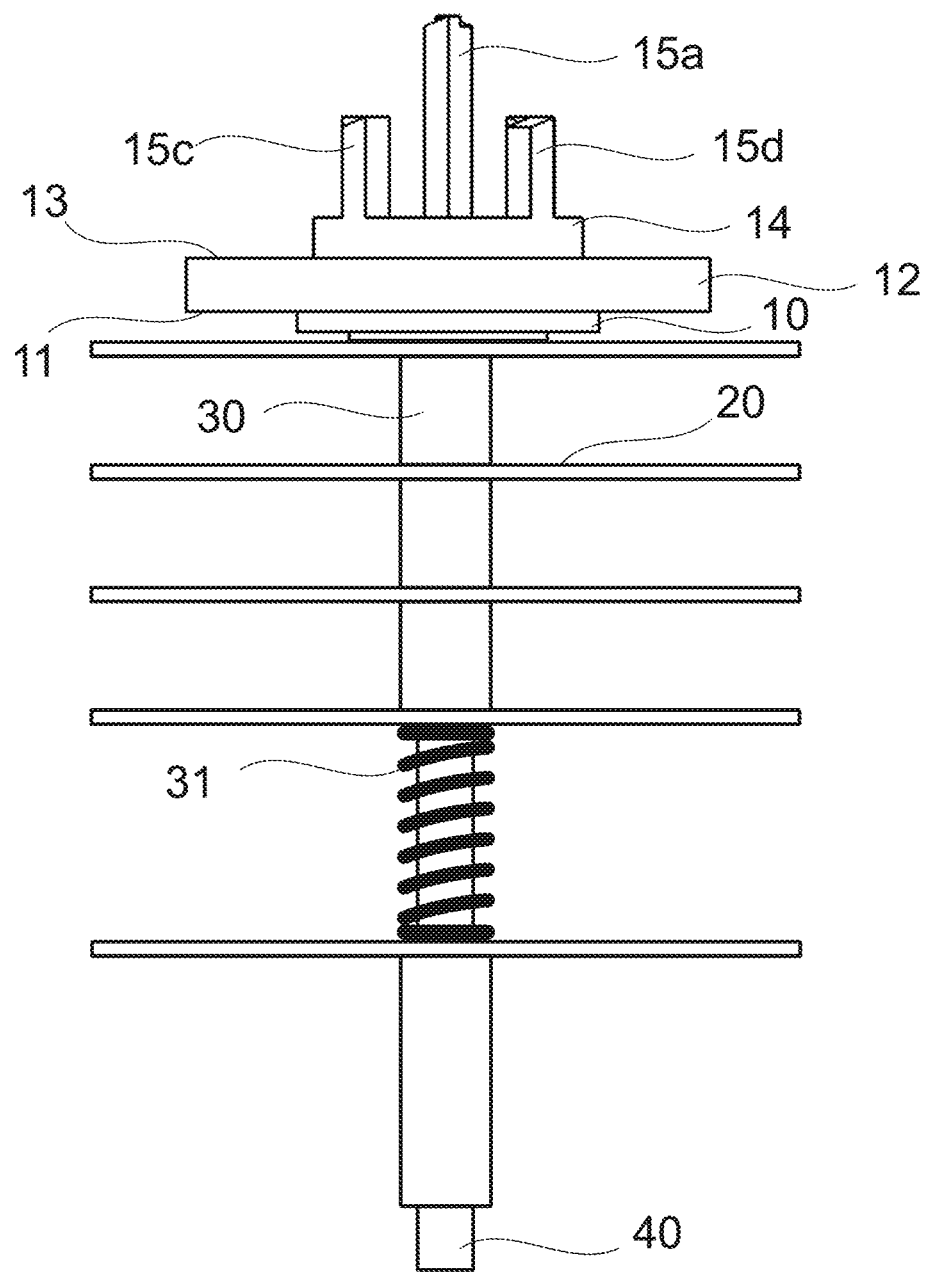
FIG. 1 shows a device according to an embodiment of the invention as seen perpendicularly to the rotation axle of the device.
Figure 2:
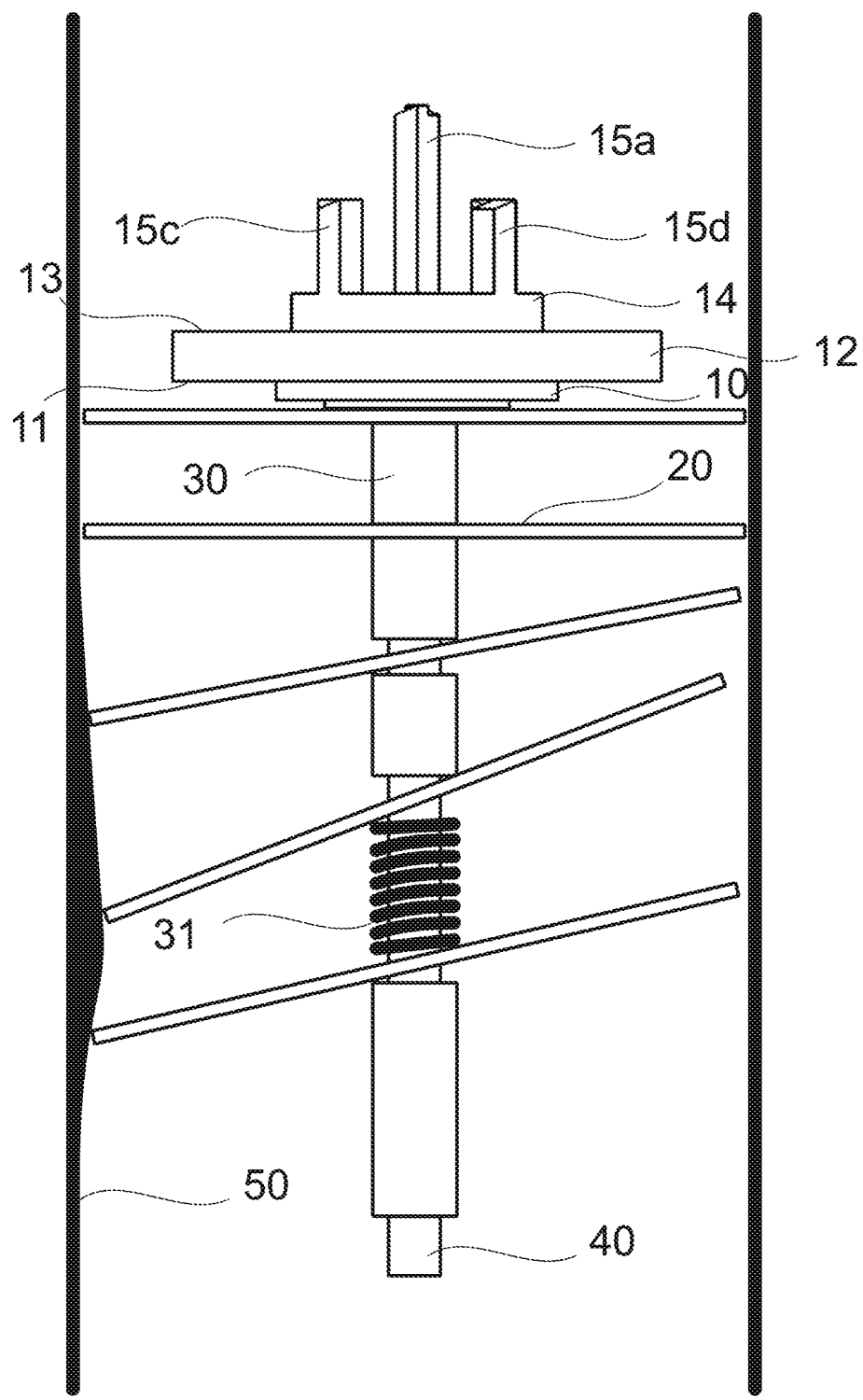
FIG. 2 shows a device according to an embodiment of the invention in a pipe, passing an obstacle.
Figure 3:
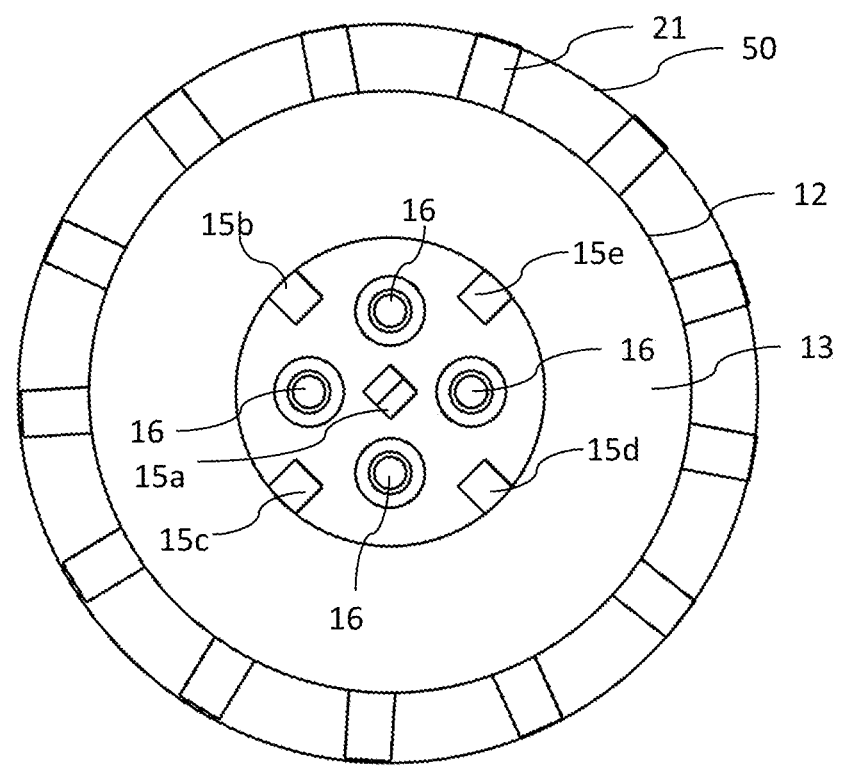
FIG. 3 shows a device according to an embodiment of the invention as seen in the direction of the rotation axle of the device from the end having the tip part.

FIG. 1 shows a device according to an embodiment of the invention as seen perpendicularly to the rotation axle of the device. In FIG. 3, the same device is shown from the direction of the rotation axle, at the tip part end. The front of the device, that is to say, the first part to advance in the pipe towards the branch point to be opened, has a tip part 14 that has one or more blades 15*a-e*. In an embodiment, one large-diameter blade 15*a* is used at the centre of the tip part. In another embodiment, one blade is employed at the centre of the tip part and, for example, two, three, or four shorter blades (15*b-e*) evenly positioned on the perimeter of the tip part, whereby when the tip part is rotated the blade at the centre makes the first hole in the branch point where the blades positioned on the perimeter cut a round piece off around the centre hole. The blades are rectangular prisms, for example, the bottom of which has the shape of a rectangle. The top surface of a blade may be shaped, for example, bevelled to an angle deviating from a right angle in relation to the sides of the blade, so that as the blade hits the material being machined only a part of the top surface first makes contact with the material being machined. This way, the blade is at the beginning of machining subjected to a lighter force, and the risk for the device to get stuck as the blade hits the material being machined is reduced. If the entire top surfaces of all the blades make contact with the material being machined at the same time, the blades and the device are subjected to large forces and may wear out unnecessarily fast or even break immediately.

In FIG. 1, right below the tip part 14, grinding means 11, 12, 13 are presented, consisting of a support disc 12 and grinding surfaces on one side 13 or both sides 11, 13 of it. The support disc 12 may be, for example, polymer or cellulose based material, such as nylon, cardboard, fibreboard, or wood. The support disc 12 has on its surface on one or two sides grinding elements that make the surface grinding. The grinding elements may be, for example, rock material, diamond, metal, ceramic material or other hard and wear-resistant material suitable for grinding epoxy resin or other materials used for pipe system renovation. The support disc and its one or two grinding surfaces have a larger diameter than the tip part, but smaller than the centralizing means 20, 21, 30, 31. The ring-shaped outer surface of the support disc in the grinding means, which is the outermost from the rotation axle, is in one embodiment left without the grinding elements so that the rotating grinding means would not cause damage to the pipe 50 even in case of a potential fault situation in which the outer surface in question hits the inner surface of the pipe 50.

The tip part 14 and grinding means 11, 12, 13 are tightly interconnected by, for example, securing the tip part 14 to a bottom plate 10 by screws 16, bolts, or rivets so that the grinding means are pressed between the tip part and the bottom plate. Alternatively, the grinding means are fixed to the bottom plate and the tip part to the grinding means. In an embodiment, the support disc 12 of the grinding means also acts as the bottom plate. Because the tip part and the grinding means are interconnected, they are arranged to rotate together. The entity consisting of the tip part, grinding means, and bottom plate has means for mounting the rotation axle 40. By the use of the rotation axle, power is conveyed to the tip part and grinding means in order to machine material in front of the device. The means for mounting the rotation axle may be arranged in connection with the tip part, grinding means, and/or the bottom plate. In an embodiment, the tip part, grinding means and/or bottom plate comprises a fixed rotation axle, one end of which has means for connecting said rotation axle to another rotation axle, such as a rotation axle in connection with power transmission means. The rotation axle used in connection with the device is advantageously flexible but stiff in thrust, such as a wire rope, steel wire rope, woven steel cable, or a similar piece, whereby the device may be pushed forward in the pipe by pushing it on the rotation axle.

The part of the device, arranged to be rotatable, therefore comprises the tip part with its blades, the grinding means and possibly the bottom plate to which the aforementioned parts are mounted. The centralizing means 20, 21, 30, 31 of the device are separate from the part arranged to be rotatable. In an embodiment, the centralizing means consist of a plurality of round discs 20 from the outer edge of which numerous protrusions 21 may be protruding. At the time the device is in unoperated state, the discs 20 and their protrusions 21 are perpendicular to the rotation axle. In the middle of the disc there is a hole through which the rotation axle may pass and in which it may freely rotate without rotating the disc, at least in any significant amount. Significant amount refers to such an amount that would unquestionably cause damage to the pipe in which the device is used, in connection with performing work.

The protrusions 21 in the disc 20 of the centralizing means may be established by making radial cuts in the disc, for example. The discs 20 and protrusions 21 in the centralizing means are dimensioned according to the pipe where the device is to be used. The diameters of the discs may be, for example, 10%, 15%, 20%, 25%, 30%, 35%, 40%, 45%. 50% or 55% smaller than the diameter of the pipe. The choice of the disc diameter is affected by, among other things the number of bends in the pipe, their radius of curvature and length, whereby the diameter of the discs 20 is selected such that the device may be driven through the pipe 50 to the branch point to be opened up. The protrusions are more flexible than the discs and they are so dimensioned that they reach the inner surface of the pipe, they are slightly longer than the difference between the radius of the disc 20 and pipe 50, whereby they bend as the device is pushed into the pipe, or so that some of the protrusions are shorter, some of equal length, and some longer than the difference between the radius of the disc and pipe, whereby the device sets well at the centre of the pipe, but may still be easily pushed through the bend sections of the pipe. The centralizing means keep the tip part 14 and its blades 15*a-e* off the inner surface of the pipe, whereby the blades will not damage the inner surface of the pipe. By applying different dimensions to the discs and protrusions, the device may be used, for all practical purpose, from pipes less than 50 mm in diameter to pipes however large.

In the centralizing means according to the invention, there are tubes arranged between the discs around the rotation axle, inside of which the rotation axle may pass and where it may freely rotate without at the same time rotating the tube at least in any significant amount. Significant amount refers to such an amount that would unquestionably cause damage to the centralizing means when work is being performed. The rotation axle may be taken to the part arranged to be rotatable through the holes at the centre of the discs and the tubes that keep the discs apart from each other. The embodiment shown in FIG. 1 has four discs 20 with their protrusions 21 and three tubes 30 between them, a spring 31 after the fourth disc 20, and one more disc 20 after the spring. The discs and protrusions are advantageously of an elastic material so that they would bend upon meeting an obstacle and, after passing the obstacle, return into straight discs again. The elasticity and ability to pass obstacles may be improved by protrusions on the perimeter of the disc whereby only one protrusion bends when an obstacle is met instead of the whole disc. Despite the elasticity of the discs and protrusions, the observation has been made that the device is difficult or impossible to take through complex pipe systems.

The use of a softer material in the discs and protrusions helps up to a point, but the problem of poor centralizing characteristics of the device in unoperated state will emerge, if too soft a material is used in the discs and protrusions. The discs and protrusions are advantageously made of nylon or an elastic plastic material in general.

The problem between advancement inside the pipe and, on the other hand, centralizing is solved by the use of spring loading to position the discs 20 and tubes 30. A spring 31, such as a coil spring, strung around the rotation axle squeezes the discs 20 and tubes 30 against each other, whereby the discs 20 and their protrusions 21 point perpendicularly away from the rotation axle. As the device meets a small obstacle or curve in a pipe, the discs 20 and protrusions 21 bend slightly, but as the force grows high enough, the spring 31 shortens as it is compressed, whereby the discs 20 are able to turn in relation to the rotation axle, which makes it easier to pass the obstacle or curve in the pipe. After the obstacle or curve has been passed, the force exerted on the disc 20 disappears, and the spring 31 once more squeezes the discs 20 and tubes 30 against each other, whereby the discs 20 and their protrusions 21 again point perpendicularly away from the rotation axle. In an embodiment, one, two, three or more springs 31 are employed, whereby some of the springs may replace a tube between the discs. In an embodiment, one or more tubes 30 between the discs 20 are elastic and act as the spring 31, whereby a separate coil spring, for example, is not necessarily needed.

Because the discs 20 are relatively thin, it is possible for them to turn to a 45 degrees angle in relation to the rotation axle, for example, if the hole in the disc for the rotation axle is only slightly larger than the rotation axle. The thicker the disc being used is, the larger must the hole be for the disc to have enough room to turn. In an embodiment, the discs 20 are advantageously 0.5-5 mm thick, more advantageously 0.5-3 mm, and most advantageously 1-2 mm thick. One of the benefits of the device is that there is no need to rotate the rotation axle at the time the device is only just led to the branch point to be machined by pushing it on the rotation axle.

FIG. 3 shows a device according to an embodiment of the invention passing an obstacle in a pipe 50. The centralizing means in the device consist of one disc, a spring 31 following it, and three separate tubes in between the four discs. The combination of discs, tubes, and a spring allows the device to be brought through even the most curved and demanding pipe systems, through which prior art machining devices suitable for machining in plastic pipes cannot be taken. Spring-loaded discs 20 with protrusions and tubes 30 establish, at two points, an elastic structure that bends and turns upon meeting an obstacle, and having passed the obstacle, is well restored from bending. For reasons of clarity, FIG. 3 only shows the turning of the discs 20, the moving of the tubes 30, and the compression of the spring 31. In practice, the discs 20 also bend, as does the rotation axle 40, whereby the device adapts to obstacles in a pipe system in at least three ways, which makes this device one that can advance in the pipe system exceptionally well.

The centralizing means work the better the longer they are, because very short centralizing means arranged very close to the part arranged rotatable allows far greater deviations of the part arranged rotatable from the rotation axle than longer centralizing means, or those that are distributed on a longer distance. However, the length and structure of the centralizing means affect the advancement characteristics of the device inside the pipe, so in the case of a curved pipe, in particular, there is no reason for unnecessarily enlarging the centralizing means.

The device may be used as part of a system, which additionally comprises power transmission means and a motor to produce the power. The power transmission means comprise a flexible rotation axle which is stiff in thrust, and a protecting tube at least partly surrounding the rotation axle, which is so loose that is does not rotate when the rotation axle is rotating, but rigid enough to allow the handling of the rotation axle with the aid of the protecting tube. To facilitate connecting the rotation axle, the protecting tube may be left out of the beginning and/or end of the rotation axle. By mounting a device according to the invention to one end of the rotation axle and a motor that rotates the rotation axle to the other end of the rotation axle, the rotating motion produced by the motor may be converted into rotating motion of the tip part and grinding means of the device. By means of the system, the device may be first pushed into a pipe by feeding the rotation axle to the pipe by pushing on the protecting tube. Due to the protrusions, there will be an air space in the device left between the body or bodies of the centralizing means and the inner surface of the pipe, as a result of which the advancement of the device in the pipe may be monitored by a camera installed behind the device. A camera allows the pipe portion or obstacle ahead to be examined through the protrusions, whereby the camera will stay intact and clean also when the blades of the tip part or the grinding means are used to machine the material at the branch point when making a hole, for example. There is no need to rotate the rotation axle at the time the device is only just led to the branch point to be machined by pushing it on the protecting tube. This way, the non-rotating blades may be safely taken to the spot to be machined.

Once the device has been successfully pushed to the branch to be opened, the motor of the system may be switched on, whereby the rotation axle starts to rotate and rotates the tip part and its blades as well as the potential grinding means. The rotation axle rotates inside the discs 20 of the centralizing means and the tubes 30 without, however, rotating them at least in any significant amount. By pushing on the protecting tube surrounding the rotation axle of the system power transmission means, the device will thrust its way all the way to the branch point to be opened up, and the blades start machining material off the branch point. Once the blades have made a hole in the branch point, the device may be pushed forward until the grinding means start to grind the hole made by the blades of the tip part bigger. The device is kept pushed against the branch point being ground until the grinding means have ground the hole so big that it thrusts its way through the hole. After this, the device is brought to a halt, and the work outcome may be checked with a camera, if one is in use, and the device be removed from the pipe by pulling on the protecting tube of the power transmission means, whereby the device comes out with it. The hole that was made is still smaller than the diameter of the pipe, and the task may easily be finished by means of equipment made for the purpose, because the hole is now at the centre of the pipe leading to the branch point.

When machining a branch point covered by epoxy resin, for example, drilling and/or grinding needs to continue for so long and/or with such high speeds of rotation that centralizing means rotating with the tip part would break or melt a pipe made of a polymeric material. The use of discs with protrusions in the centralizing means makes it possible to use the device in a curved pipe, but still guarantees good centralizing characteristics and makes it possible to use a camera both when the device is being led to the point to be machined and during machining.

It will be apparent to a person skilled in the art that as technology advances, the basic idea of the invention may be implemented in many different ways. The invention and its embodiments are thus not restricted to the examples described above but may vary within the scope of the claims.

While the present invention has been described in accordance with preferred compositions and embodiments, it is to be understood that certain substitutions and alterations may be made thereto without departing from the spirit and scope of the following claims.

I claim:

1. A device for opening up a branch point in a pipe assembly, comprising:
   a rotation axle arranged to be rotatable and a tip part located at a most front portion of the device arranged to be rotatable and in connection of which there is at least one blade, as well as a centralizing system separate from the tip part and arranged to be substantially non-rotating when the tip part is rotated, and the centralizing system comprising a first disc and a second disc through which the rotation axle is arranged to pass, and a spring located between the first disc and the second disc that urges the first disc away from the second disc and positions the discs as planes perpendicular to the rotation axle;
   each of the discs having numerous protrusions radially protruding from an outer edge of the discs, the protrusions being more elastic than the discs;
   the blade being attached to the tip part and extending in a forward and longitudinal direction from the tip part; and each protrusion of the discs being movable between a first position wherein the protrusion is perpendicular relative to the rotation axle and a second bent position without bending said discs.

2. A device as claimed in claim 1, wherein the device comprises a grinding device in connection with the tip part, for rotating with the tip part, and which the grinding device comprises at least one grinding surface.

3. A device as claimed in claim 1 wherein the protrusions are arranged to press against an inner surface of a pipe in the pipe assembly, and to centralize the device in the pipe in such a manner that the tip part of the device is off the inner surface of the pipe.

4. A device as claimed in claim 1 wherein as the discs of the centralizing system meet an obstacle in a pipe, the protrusions of the discs are arranged to bend in relation to the rotation axle.

5. A device as claimed in claim 1 wherein the centralizing system comprises at least one tube between said at least two discs, said at least one tube is elastic and arranged to act as the spring.

6. A device as claimed in claim 1 wherein the centralizing system comprises at least one coil spring between said at least two discs.

7. A method of using the device as claimed in claim 1 for machining material in a pipe assembly.

* * * * *